United States Patent
Barsness et al.

(10) Patent No.: US 8,200,846 B2
(45) Date of Patent: Jun. 12, 2012

(54) TIMESTAMP SYNCHRONIZATION FOR QUERIES TO DATABASE PORTIONS IN NODES THAT HAVE INDEPENDENT CLOCKS IN A PARALLEL COMPUTER SYSTEM

(75) Inventors: Eric Lawrence Barsness, Pine Island, MN (US); David L. Darrington, Rochester, MN (US); Amanda Peters, Cambridge, MA (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 12/368,500

(22) Filed: Feb. 10, 2009

(65) Prior Publication Data

US 2010/0205323 A1    Aug. 12, 2010

(51) Int. Cl.
*G06F 15/16*    (2006.01)
(52) U.S. Cl. ....................................... 709/248
(58) Field of Classification Search .................... 709/248
See application file for complete search history.

(56) References Cited

U.S. PATENT DOCUMENTS

| 5,701,480 | A | * | 12/1997 | Raz | 718/101 |
|---|---|---|---|---|---|
| 6,125,368 | A | * | 9/2000 | Bridge et al. | 1/1 |
| 7,813,817 | B2 | * | 10/2010 | Lipner et al. | 700/19 |
| 2003/0140050 | A1 | * | 7/2003 | Li et al. | 707/100 |
| 2004/0153459 | A1 | * | 8/2004 | Whitten et al. | 707/10 |
| 2005/0050106 | A1 | * | 3/2005 | Wenner et al. | 707/200 |
| 2006/0047713 | A1 | * | 3/2006 | Gornshtein et al. | 707/202 |
| 2009/0006860 | A1 | * | 1/2009 | Ross | 713/189 |

OTHER PUBLICATIONS

Joana M. F. Trindade, Gabriela Jacques-Silva, Roberto Jung Drebes, Taisy Silva Weber, Ingrid Jansch-Porto; Off-line Synchronization of Distributed Logs in Fault Injection Test Campaigns, IEEE, 2006, pp. 137-142.*

* cited by examiner

*Primary Examiner* — Hieu Hoang
(74) *Attorney, Agent, or Firm* — Martin & Associates LLC; Derek P. Martin

(57) ABSTRACT

A parallel computer system has multiple nodes that have independent clocks, where the different nodes may include different database portions that are referenced by a query. A timestamp parameter in a query is synchronized across the different nodes that are referenced by the query to assure the timestamps in the different nodes are consistent with each other notwithstanding the independent clocks used in each node. As a result, a database may be scaled to a parallel computer system with multiple nodes in a way that assures the timestamps for different nodes referenced during a query have identical values.

6 Claims, 7 Drawing Sheets

|  | CUSTOMERS | | | |
|---|---|---|---|---|
| LastName | FirstName | Phone | CustCode | Timestamp |
|  |  |  |  |  |
|  |  |  |  |  |
|  |  |  |  |  |

FIG. 2

INSERT INTO CUSTOMERS VALUES ("Miller", "John", "555-212-4321", CURRENT TIMESTAMP)

FIG. 3

|  | CUSTOMERS | | | |
|---|---|---|---|---|
| LastName | FirstName | Phone | CustCode | Timestamp |
| Miller | John | 555-212-4321 | 7568 | 2008-08-12 09:43:5685 |
|  |  |  |  |  |
|  |  |  |  |  |

FIG. 4

TIMESTAMP SYNCHRONIZATION FOR QUERIES TO DATABASE PORTIONS IN NODES THAT HAVE INDEPENDENT CLOCKS IN A PARALLEL COMPUTER SYSTEM

BACKGROUND

1. Technical Field

This disclosure generally relates to parallel computer systems, and more specifically relates to timestamp synchronization for queries to database portions in nodes that have independent clocks in parallel computer systems.

2. Background Art

Database systems are well-known, and allow queries to be executed to retrieve data from one or more database tables. A query language such as Structured Query Language (SQL) is typically used to write database queries. It is often useful to include a timestamp parameter in a query so the database system can identify exactly when the query was executed. When executing an SQL query to database portions that have a common clock, the timestamps will all be based on the common clock and will therefore be consistent. However, many parallel computer systems include multiple nodes that each have an independent clock. When a query references different database portions that have independent clocks, the timestamp value for one portion will not necessarily match the timestamp value for the same query on a different portion that has a different clock. Without a way to synchronize the timestamp parameters in different nodes that execute a common query in a parallel computer system, the timestamp parameter will have limited value due to the potential differences between timestamps for different portions of the same query.

BRIEF SUMMARY

Timestamps for a query executed across multiple nodes that have independent clocks in a parallel computer system are synchronized by referencing a time server and making sure the timestamps for all portions of the query are identical. This can be done by writing a local timestamp in each node for the query, requesting a consistent timestamp for the query from the time server, then replacing the local timestamps with the consistent timestamp. This can also be done by writing a local timestamp in each node for the query, requesting a baseline clock from the time server, comparing the clock in each node with the baseline clock, and adjusting the timestamp in each node according to the computed difference between the local clock and the baseline clock to make the timestamps in all nodes consistent. Another way to synchronize timestamps is for each node to request a timestamp for the query from the time server, which assigns a common timestamp for the query, then delivers the assigned timestamp to all nodes that requested the timestamp for the query. Yet another way to synchronize timestamps is for a database server that receives a query with a timestamp parameter to request a timestamp from the time server, then replace the timestamp parameter with a literal value for the timestamp received from the time server, then dispatching the query to the nodes with the literal value in the place of the timestamp parameter. All of these methods assure timestamps for a given query are synchronized across nodes that have independent clocks.

The foregoing and other features and advantages will be apparent from the following more particular description, as illustrated in the accompanying drawings.

BRIEF DESCRIPTION OF THE SEVERAL VIEWS OF THE DRAWING(S

The disclosure will be described in conjunction with the appended drawings, where like designations denote like elements, and:

FIG. 2 is a sample database table;

FIG. 3 is a sample database query;

FIG. 4 shows the database table in FIG. 2 after executing the query in FIG. 3;

DETAILED DESCRIPTION

The disclosure and claims herein relate to a parallel computer system with multiple nodes that have independent clocks, where the different nodes may include different database portions that are referenced by a common query. A timestamp parameter in a query is synchronized across the different nodes that are referenced by the query to assure the timestamps in the different nodes are consistent with each other notwithstanding the independent clocks used in each node. As a result, a database may be scaled to a parallel computer system with multiple nodes in a way that assures the timestamps for different nodes referenced during a query have the identical value.

Figure 1:
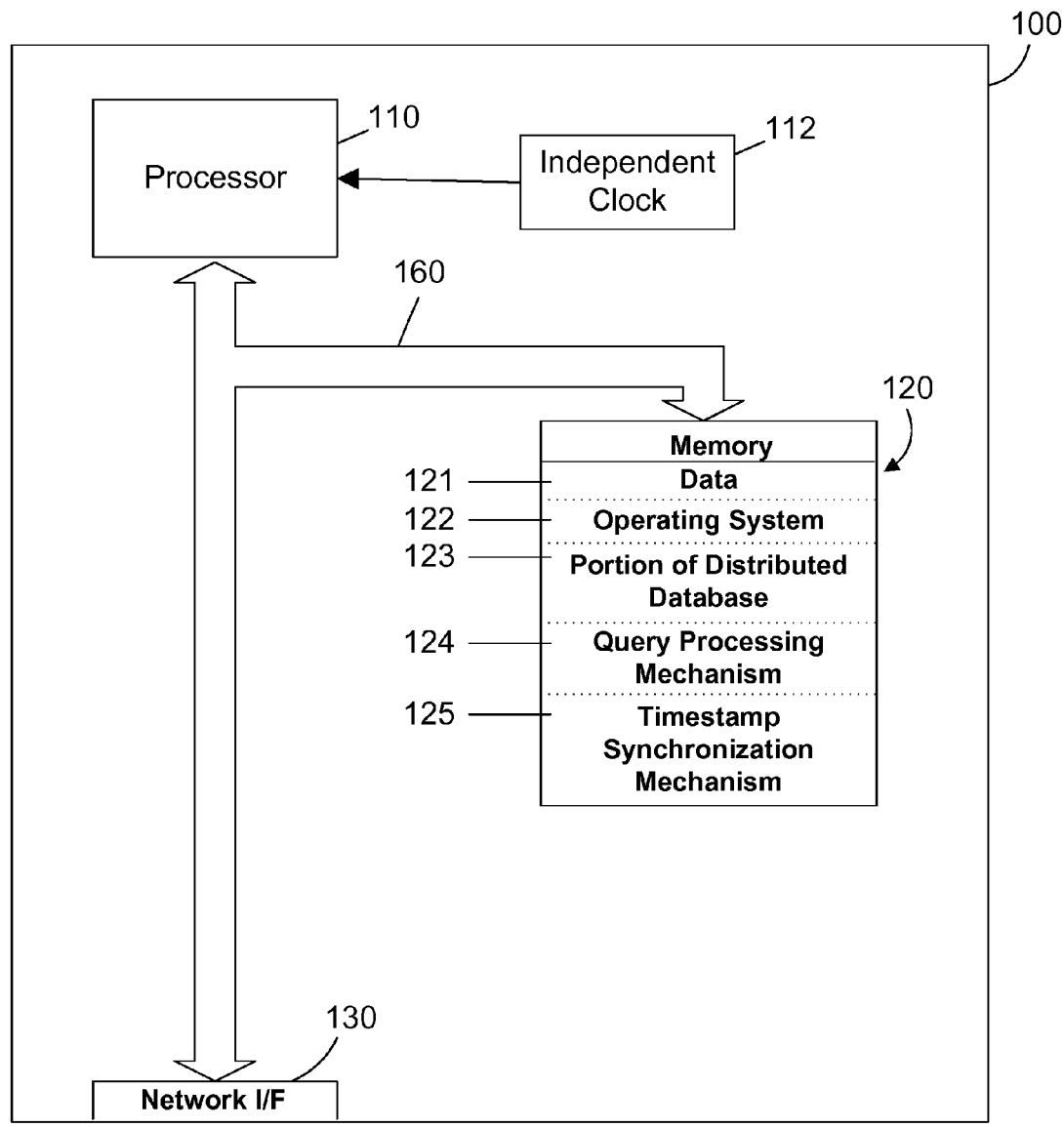
FIG. 1 is a block diagram of one specific implementation for a node that may be used in a parallel computer system.

FIG. 1 shows a sample computer system 100 that may be used as a node in a parallel computer system. Those skilled in the art will appreciate that the disclosure herein applies equally to any computer system 100, regardless of whether the computer system is a complicated multi-user computing apparatus, a single user workstation, or an embedded control system. Examples of computer system 100 include an IBM Power Systems computer system, or a node in a multiprocessor computer system such as BlueGene developed by IBM. As shown in FIG. 1, computer system 100 comprises one or more processors 110, an independent clock 112, a main memory 120, and a network interface 130. These system components are interconnected through the use of a system bus 160.

The independent clock 112 is shown in FIG. 1 as a clock source for processor 110. One skilled in the art will recognize that many computer systems may include many different clocks. In its broadest sense, independent clock 112 simply denotes that node 100 operates using a clock that is not the same as clocks on other nodes. This means locally-derived timestamps will not be consistent across nodes.

Main memory 120 preferably contains data 121, an operating system 122, a portion of a distributed database 123, a query processing mechanism 124, and a timestamp synchronization mechanism 125. Data 121 represents any data that serves as input to or output from any program in computer system 100. Operating system 122 is a multitasking operating system; however, those skilled in the art will appreciate that the spirit and scope of this disclosure is not limited to any one operating system. One example of a suitable operating system is known in the industry as i5/OS. Portion of a distributed database 124 represents any suitable portion of a database that may exist on a node, such as a table or table portion. In the preferred implementation discussed herein, different nodes include different database portions that are all accessed by the same query. For example, a query could access different portions of a partitioned database table that is contained in multiple nodes. In another example, a query could access different tables contained in multiple nodes.

Query processing mechanism 124 processes a query to the portion of distributed database 123. In the preferred implementations shown in the figures, each computer system 100 that is a node in a parallel computer system includes its own query processing mechanism 124 for processing a portion of the query that relates to the portion of distributed database 123 that resides on the node. The timestamp synchronization mechanism 125 assures the timestamp on each node that participates in the query has an identical value. The timestamp synchronization mechanism 125 may function in a number of different ways to synchronize timestamps, as explained in detail below.

Computer system 100 utilizes well known virtual addressing mechanisms that allow the programs of computer system 100 to behave as if they only have access to a large, single storage entity instead of access to multiple, smaller storage entities. Therefore, while data 121, operating system 122, portion of distributed database 123, query processing mechanism 124, and timestamp synchronization mechanism 125 are shown to reside in main memory 120, those skilled in the art will recognize that these items are not necessarily all completely contained in main memory 120 at the same time, and are not necessarily in contiguous storage. It should also be noted that the term "memory" is used herein generically to refer to the entire virtual memory of computer system 100, and may include the virtual memory of other computer systems coupled to computer system 100.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 122.

Although computer system 100 is shown to contain only a single processor and a single system bus, those skilled in the art will appreciate that timestamp synchronization as disclosed and claimed herein may be practiced using a computer system that has multiple processors and/or multiple buses. In addition, the interfaces that are used preferably each include separate, fully programmed microprocessors that are used to off-load compute-intensive processing from processor 110. However, those skilled in the art will appreciate that these functions may be performed using I/O adapters as well.

Network interface 130 is used to connect computer system 100 to other computer systems or workstations via a network. Network interface 130 broadly represents any suitable way to interconnect electronic devices, regardless of whether the network comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol. In the most preferred implementation, the network interface 130 is used to couple together multiple nodes 100 to form a parallel computer system that includes different portions of a database distributed across the nodes, as shown in portion of distributed database 123 in FIG. 1.

Computer system 100 may include other features of computer systems that are not shown in FIG. 1 but are well-known in the art. For example, computer system 100 preferably includes a display interface and a mass storage interface to an external direct access storage device (DASD). The display interface is used to directly connect one or more displays to computer system 100. These displays, which may be non-intelligent (i.e., dumb) terminals or fully programmable workstations, are used to provide system administrators and users the ability to communicate with computer system 100. Note, however, that while a display interface is provided to support communication with one or more displays, computer system 100 does not necessarily require a display, because all needed interaction with users and other processes may occur via the network interface 130.

The mass storage interface is used to connect mass storage devices, such as a direct access storage device, to computer system 100. One specific type of direct access storage device is a readable and writable CD-RW drive, which may store data to and read data from a CD-RW.

While the description above is in the context of a fully functional computer system, those skilled in the art will appreciate that the timestamp synchronization mechanism may be distributed as an article of manufacture in a variety of forms, and the claims extend to all suitable types of computer-readable media used to actually carry out the distribution, including recordable media such as floppy disks and CD-RW.

Referring to FIG. 2, a sample table 200 called "Customers" is shown, and includes a LastName column, a FirstName column, a Phone column, a CustCode column, and a Timestamp column. We assume for this example table 200 is initially empty. FIG. 3 shows a sample query that performs in insert of a record into the database table 200 shown in FIG. 2. Once the insert in FIG. 3 is performed, the database table is shown at 400 in FIG. 4 to include the inserted data. When a query such as the query in FIG. 3 is executed in a single table as shown in FIGS. 2 and 4, there is a single timestamp column, so the timestamp for executing the query relates to all of the inserted data. However, when a database table is partitioned and placed on different nodes with independent clocks, each node will have a timestamp value that may not necessarily be consistent with each other. This is shown in detail in FIG. 5.

We assume for the sake of providing a simple example that database table 500 is partitioned across two different nodes that each have independent clocks, as shown in FIG. 1. The LastName and FirstName columns are located in a first node 510, while the Phone, CustCode columns are located in a second node 520. Note the Timestamp column is replicated in both nodes. This means the timestamp value relates to the portion of the data in the node. Again we assume the query in FIG. 3 is performed for the partitioned database table, with the resulting values shown in FIG. 5. Note the timestamp in node 510 does not match the timestamp in node 520 because these two nodes have independent clocks that are not synchronized to each other. Thus, we see these two timestamps are eight milliseconds different. The timestamp synchronization mechanism disclosed and claimed herein allows synchronizing the two timestamps in the different nodes so the values of the timestamps are identical, as it should be for different parts of the same query.

Figure 5:
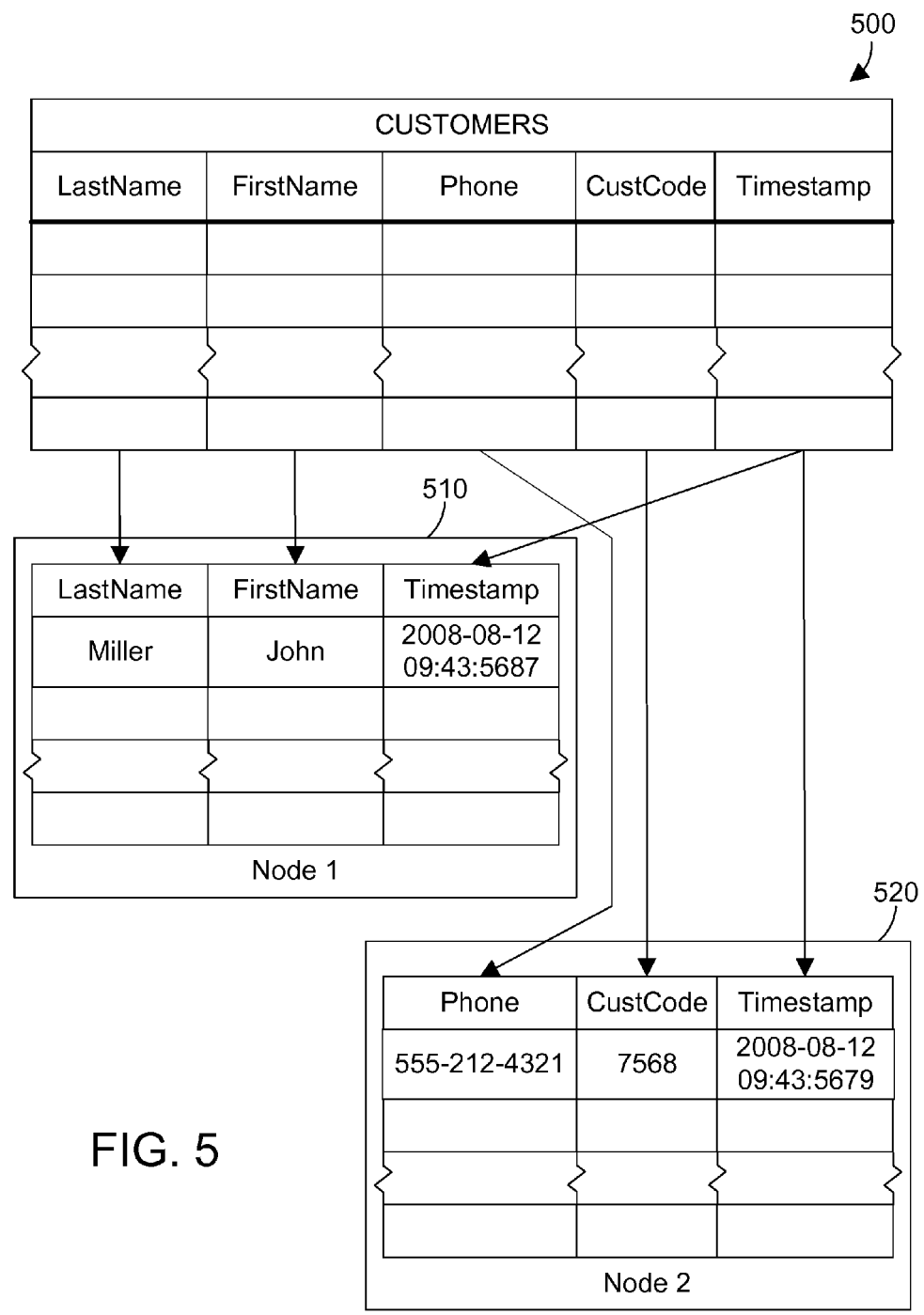
FIG. 5 is a block diagram showing a database table similar to the table in FIG. 2 except the database table in FIG. 5 is partitioned across two different nodes in a parallel computer system.
Figure 6:
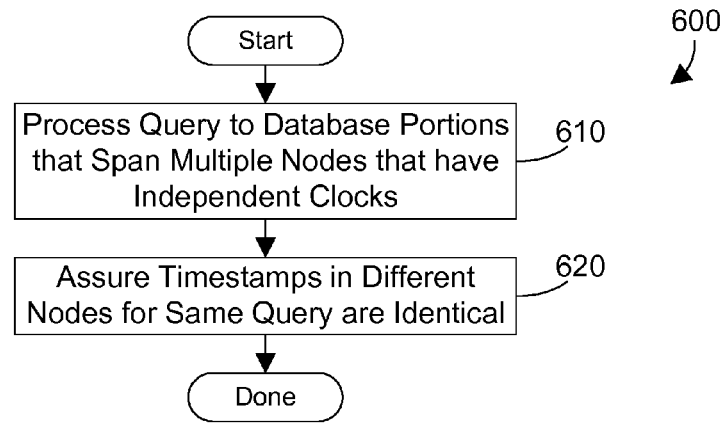
FIG. 6 is a flow diagram of a method for assuring timestamps in different nodes for the same query are synchronized.

Referring to FIG. 6, a method 600 begins by processing a query to database portions that span multiple nodes that have independent clocks (step 610). Note that tables and table portions are provided herein as suitable examples of distributed database portions that may be accessed by a common query, but the disclosure and claims herein expressly extend to any suitable database portions on different nodes that may be accessed by a common query. A partitioned table such as the one shown in FIG. 5 is one example of database portions that span multiple nodes that have independent clocks. Next, assure the timestamps in the different nodes for the same query are identical (step 620). There are many ways to assure the timestamps in the different nodes for the same query are identical, which are discussed in more detail below. Note that step 620 in FIG. 6 is preferably performed by the timestamp synchronization mechanism 125 shown in FIG. 1.

Figure 7:
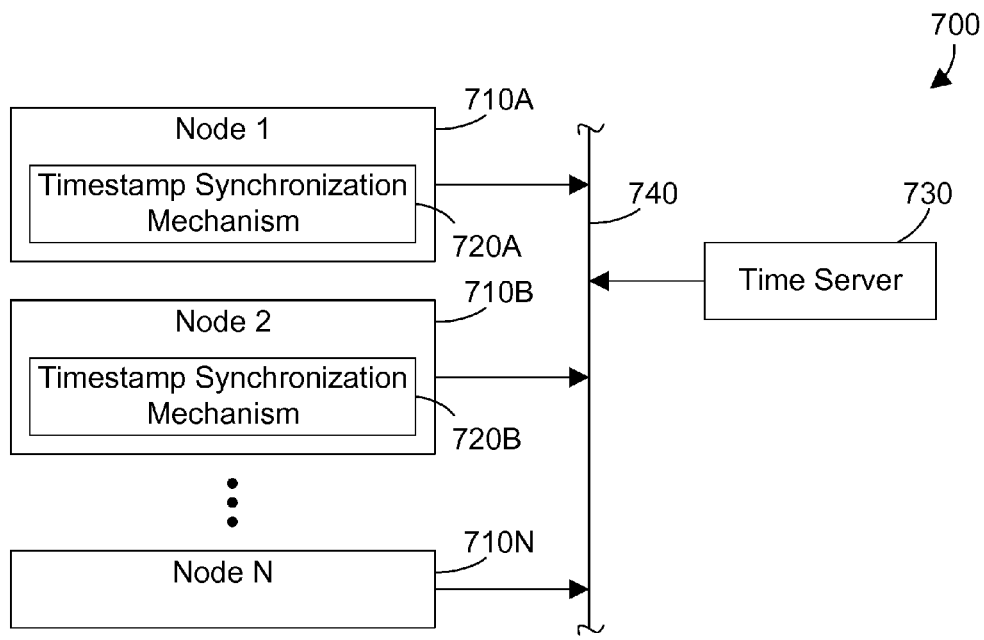
FIG. 7 is a block diagram showing networked nodes coupled to a time server.

A parallel computer system 700 in FIG. 7 shows multiple nodes 710A, 710B, . . . , 710N coupled to each other and to a time server 730 via a network 740. One or more of the nodes preferably includes a timestamp synchronization mechanism. Thus, node 710A includes a timestamp synchronization mechanism 720A, and node 710B includes a timestamp synchronization mechanism 720B. Other nodes may also include a timestamp synchronization mechanism. Note the nodes 710A, 710B, . . . , 710N are preferably similar to node 100 shown in FIG. 1.

Figure 8:
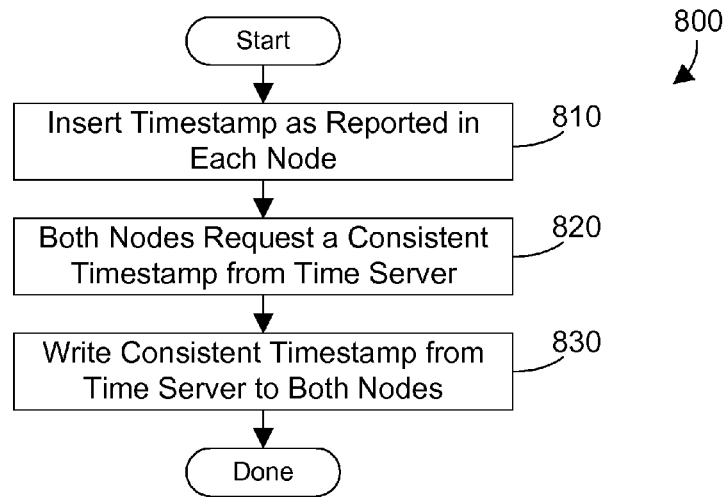
FIG. 8 is a flow diagram of a method showing a first specific implementation for step 620 in FIG. 6.
Figure 9:
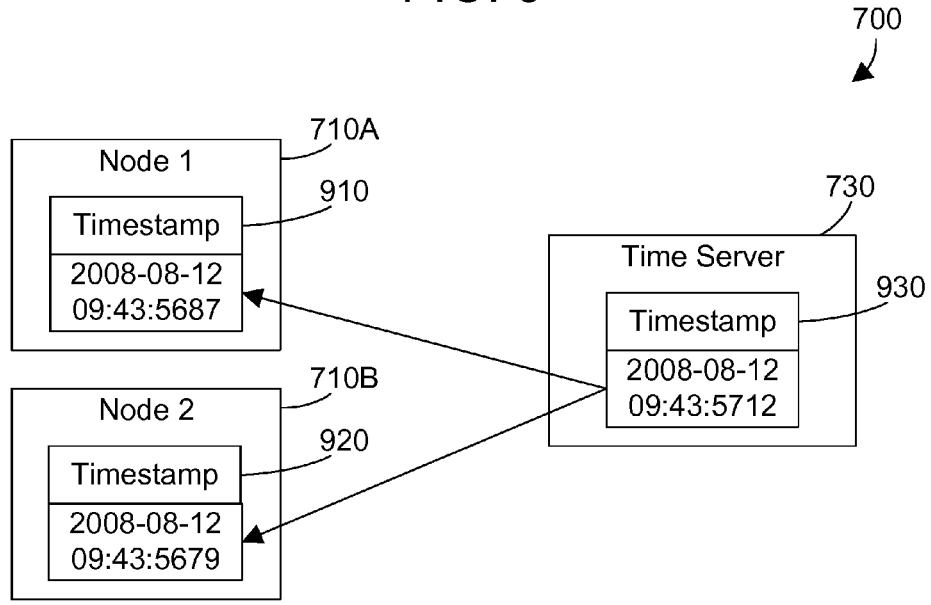
FIG. 9 is a block diagram that illustrates the method in FIG. 8.

There are different ways the timestamp synchronization mechanisms in the nodes may operate to assure the timestamps in the nodes have the same value even though each node runs on an independent clock. A first specific implementation for step 620 in FIG. 6 is shown as method 800 in FIG. 8. Each node reports its own timestamp, which is inserted into the Timestamp column in each node (step 810). Note the timestamps in the different nodes will not be consistent with each other because they are derived from the local independent clock for each node. Both nodes then request a consistent timestamp for the query from the time server (step 820). The consistent timestamp returned by the time server is then written to the Timestamp columns in both nodes (step 830). The inconsistent timestamps in the nodes are thus overwritten with the same timestamp received from the time server. Some of the steps in method 800 are shown in FIG. 9. In step 810, the local timestamps are stored, as shown at 910 and 920. Both nodes then request a consistent timestamp from the time server in step 820. We assume for this example the time server returns the timestamp 930. Note the value of the consistent timestamp can be any suitable value and can be derived in any suitable way. For example, the value could be an arithmetic average of the two local timestamps. In the alternative, the earliest timestamp could be used. The value of the timestamp is not as important as the fact that the timestamps in the different nodes have the same value. The consistent timestamp 930 shown in FIG. 9 would then be written to the timestamps 910 and 920 in step 830, resulting in overwriting the inconsistent timestamps with a timestamp that has the same value in both nodes.

Figure 10:
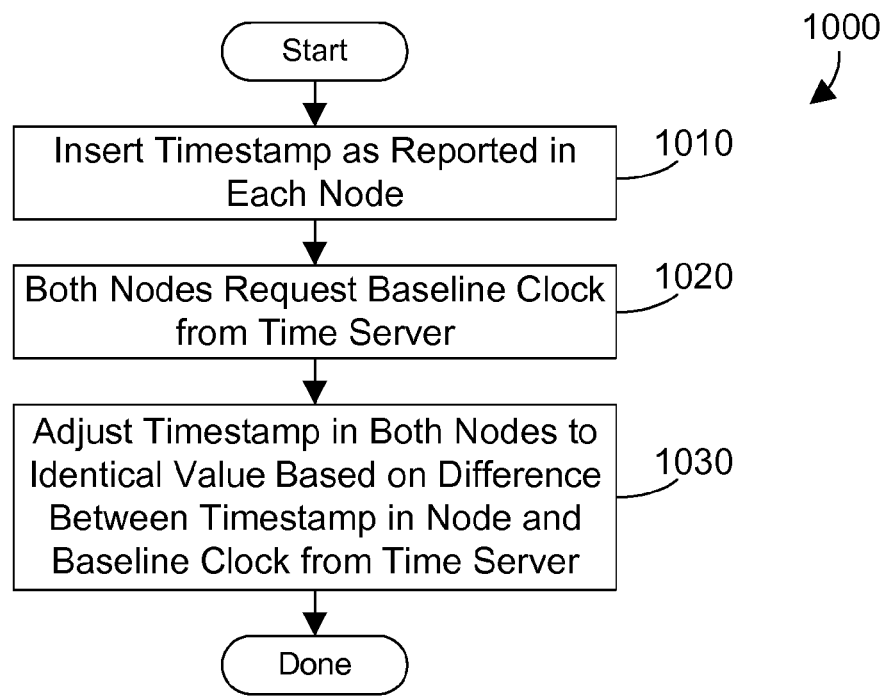
FIG. 10 is a flow diagram of a method showing a second specific implementation for step 620 in FIG. 6.

A second specific implementation for step 620 in FIG. 6 is shown as method 1000 in FIG. 10. The local timestamps reported in each node are stored (step 1010), similar to step 810 in FIG. 8. Both nodes then request a baseline clock from the time server (step 1020). The baseline clock is used to compute a difference between the baseline clock and the local independent clocks in each node. The timestamp in both nodes may then be adjusted to the same identical value based on the difference between the timestamp in each node and the baseline clock received from the time server (step 1030). For example, referring again to FIG. 9, we assume the baseline clock is 25 milliseconds faster than the independent clock in node 710A, and is 33 milliseconds faster than the independent clock in node 710B. Making adjustments to the timestamps 910 and 920 will result in both of these having the value shown at 930 in FIG. 9.

Figure 11:
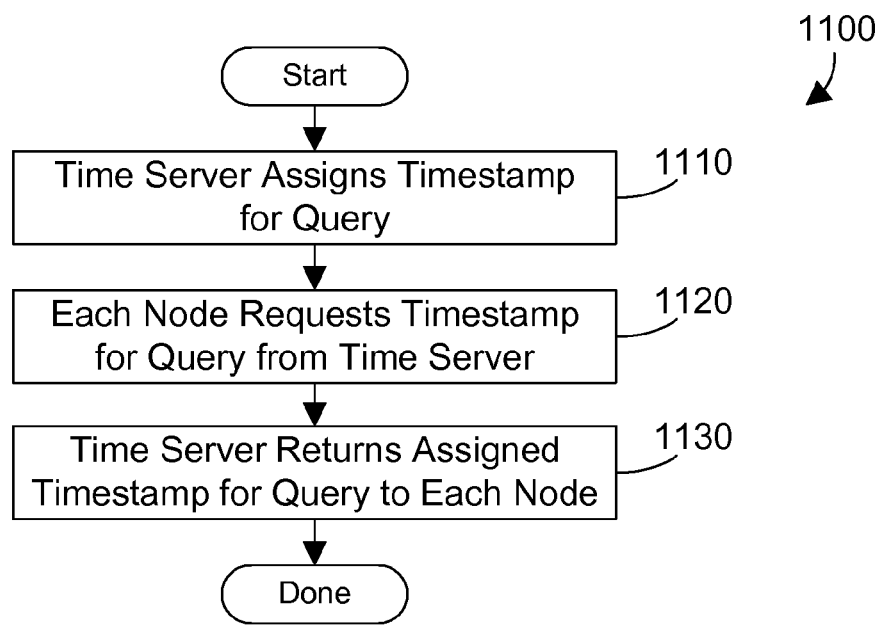
FIG. 11 is a flow diagram of a method showing a third specific implementation for step 620 in FIG. 6.
Figure 12:
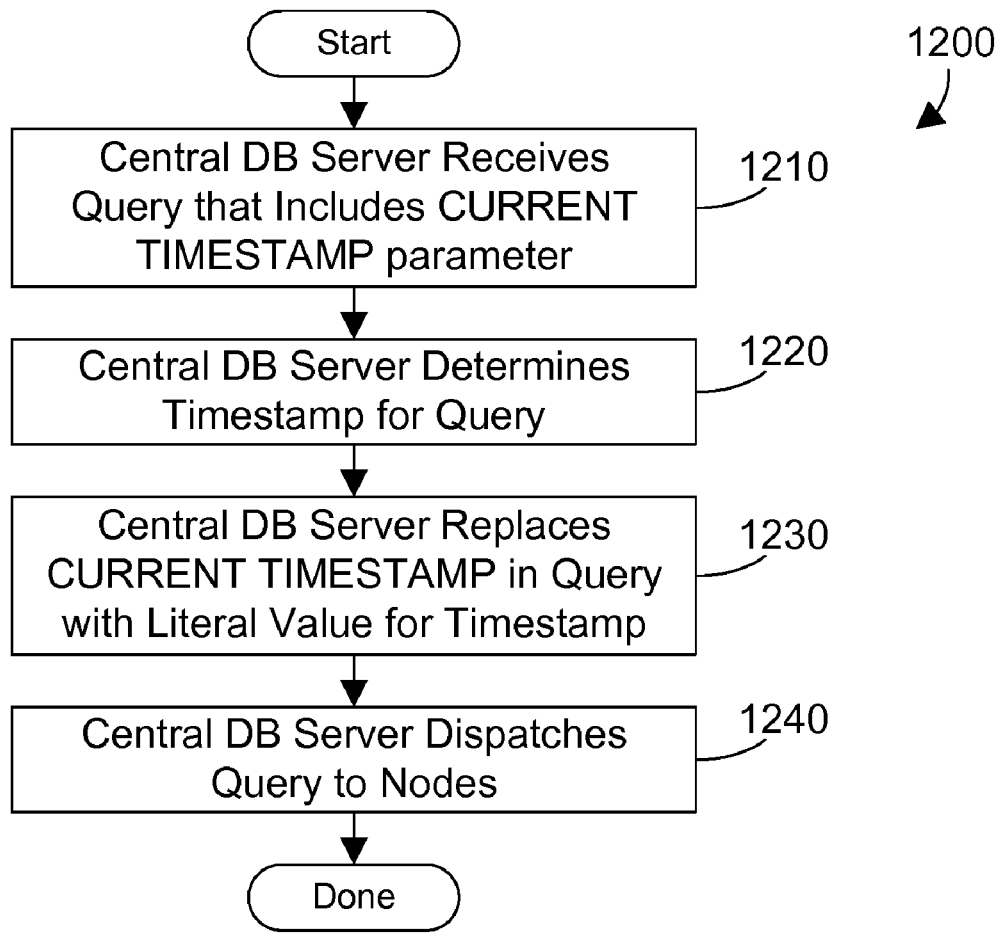
FIG. 12 is a flow diagram of a method showing an alternative implementation for method 600 in FIG. 6.

A third specific implementation for step 620 in FIG. 6 is shown as method 1100 in FIG. 11. The time server assigns a timestamp for the query (step 1110). Each node requests a timestamp for the query from the time server (step 1120). The time server then returns the assigned timestamp for the query to each node (step 1130). In this manner method 1100 creates a single timestamp for a query that is propagated to each node that participates in the query.

A method 1200 is shown that is an alternative to method 600 in FIG. 6 for assuring consistent timestamps in different nodes that have independent clocks. Essentially method 1200 creates a single timestamp for the query before query execution begins, then propagates the single timestamp to each node that processes the query. A database server receives a query that includes a CURRENT TIMESTAMP parameter (step 1210). The central database server then determines a timestamp for the query (step 1220). One suitable way to determine a timestamp is to consult the time server, but this is not strictly necessary because the central database server could simply derive a timestamp from its own independent clock. The central database server replaces the CURRENT TIMESTAMP parameter in the query with a literal value for the timestamp (step 1230). Note the value of the timestamp was derived in step 1220. The central database server then dispatches the query to the nodes (step 1240). Because the CURRENT TIMESTAMP parameter in the query was replaced by a literal value, each node receives the literal value as the value of the timestamp for the query.

The disclosure and claims herein allow synchronizing timestamps in different nodes that have independent clocks when the nodes execute a common query to different portions of a database. As a result, a database may be scaled to a parallel computer system with multiple nodes in a way that assures the timestamps for different nodes referenced during a query have identical values.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims.

The invention claimed is:

1. A parallel computer system comprising:
   a plurality of nodes coupled together that each has a processor and an independent clock, wherein each of the plurality of nodes includes a portion of a database that is referenced by a selected query to the database that includes a timestamp parameter;
   a time server coupled to the plurality of nodes and having a baseline clock that provides a reference time; and
   a timestamp synchronization mechanism executed by the processor in each of the plurality of nodes that accesses the time server and assures values for the timestamp parameter for the selected query are identical in each of the plurality of nodes, wherein each of the plurality of nodes stores a value for the timestamp parameter for the selected query according to the independent clock in each node, and the timestamp synchronization mechanism in each of the plurality of nodes requests a baseline clock from the time server and adjusts the value of the timestamp parameter for the selected query based on a computed difference between the baseline clock and the independent clock resulting in the timestamp parameters for the selected query in the plurality of nodes having identical values.

2. A parallel computer system comprising:
a plurality of nodes coupled together that each has a processor and an independent clock, wherein each of the plurality of nodes includes a portion of a database that is referenced by a selected query to the database that includes a timestamp parameter;
a time server coupled to the plurality of nodes that provides a reference time; and
a timestamp synchronization mechanism executed by the processor in each of the plurality of nodes that accesses the time server and assures values for the timestamp parameter for the selected query are identical in each of the plurality of nodes, wherein each of the plurality of nodes requests a timestamp for the selected query from the time server, and in response, the time server assigns a timestamp for the selected query and returns the assigned timestamp for the selected query to the plurality of nodes, which store the assigned timestamp as a value for the timestamp parameter for the selected query in the plurality of nodes.

3. A computer-implemented method for synchronizing timestamps in a plurality of nodes that each includes a portion of a database and that each has a processor and an independent clock, the method comprising the steps of:
(A) processing a selected query to the database that includes a timestamp parameter, the selected query referencing portions of the database in the plurality of nodes; and
(B) assuring values for the timestamp parameter for the selected query are identical in each of the plurality of nodes by performing the steps of:
each of the plurality of nodes storing a value for the timestamp parameter for the selected query according to the independent clock in each node;
each of the plurality of nodes requesting a baseline clock from a time server; and
each of the plurality of nodes adjusting the value of the timestamp parameter for the selected query based on a computed difference between the baseline clock and the independent clock.

4. A computer-implemented method for synchronizing timestamps in a plurality of nodes that each includes a portion of a database and that each has a processor and an independent clock, the method comprising the steps of:
(A) processing a selected query that includes a timestamp parameter, the selected query referencing portions of the database in the plurality of nodes; and
(B) assuring values for the timestamp parameter for the selected query are identical in each of the plurality of nodes by performing the steps of:
a time server assigning a timestamp for the selected query;
each of the plurality of nodes requesting the assigned timestamp for the selected query from the time server;
the time server returning the assigned timestamp for the selected query to the plurality of nodes; and
each of the plurality of nodes storing the assigned timestamp as a value for the timestamp parameter for the selected query.

5. An article of manufacture comprising software residing on non-transitory computer-readable media, the software comprising:
a timestamp synchronization mechanism in each of a plurality of nodes coupled together that each has an independent clock, wherein each of the plurality of nodes includes a portion of a database that is referenced by a selected query that includes a timestamp parameter, the timestamp synchronization mechanism accessing a time server that has a baseline clock that provides a reference time and assuring values for the timestamp parameter for the selected query are identical in each of the plurality of nodes, wherein each of the plurality of nodes stores a value for the timestamp parameter for the selected query according to the independent clock in each node, and the timestamp synchronization mechanism in each of the plurality of nodes requests a baseline clock from the time server and adjusts the value of the timestamp parameter for the selected query based on a computed difference between the baseline clock and the independent clock resulting in the timestamp parameters for the selected query in the plurality of nodes having identical values.

6. An article of manufacture comprising software residing on non-transitory computer-readable media, the software comprising:
a timestamp synchronization mechanism in each of a plurality of nodes coupled together that each has an independent clock, wherein each of the plurality of nodes includes a portion of a database that is referenced by a selected query to the database that includes a timestamp parameter, the timestamp synchronization mechanism accessing a time server that provides a reference time and assuring values for the timestamp parameter for the selected query are identical in each of the plurality of nodes, wherein each of the plurality of nodes requests a timestamp for the selected query from the time server, and in response, the time server assigns a timestamp for the selected query and returns the assigned timestamp for the selected query to the plurality of nodes, which store the assigned timestamp as a value for the timestamp parameter for the selected query in the plurality of nodes.

* * * * *